Patented Jan. 28, 1941

2,230,082

UNITED STATES PATENT OFFICE 2,230,082

ASTRINGENT PREPARATION

Jules B. Montenier, Chicago, Ill.

No Drawing. Application April 22, 1938,
Serial No. 203,644

11 Claims. (Cl. 167—90)

My invention is concerned with improvements in cosmetic astringent preparations.

Astringent compositions for cosmetic purposes have been known for a considerable period of time. Among the chemical compounds whose use for such purposes is known, or which have been suggested, as effective to prevent even the temporary exudation of perspiration from the sweat glands, are, for example, tartaric acid, benzoic acid, various salts of such acids, chromic acid, boric acid, various salts of salicylic acid, certain zinc salts, alums, ferric chloride, and salts of aluminum such as the acetate, chloride, lactate, sulphate, sulpho-carbolate, and aceto-tartrate. Because of certain shortcomings or deficiencies of various of these astringent materials as, for example, the relative toxicity of chromic acid and the irritating effects of zinc salts, the relatively low efficiency of tartaric acid, boric acid, benzoic acid, the salts of salicyclic acid, and the tendency of ferric chloride to stain and its mordanting effect upon fabrics worn on the body close to the point of application of the astringent, said astringents have not met with commercial success. Some of them also possess other practical deficiencies which have also militated against their more widespread use.

Of all of the known cosmetic astringents, aluminum chloride has been most universally employed. Being a salt of a polyvalent metal, namely, trivalent aluminum, its efficiency as an astringent, which appears to be in direct ratio to the atomic weight of the acid or acid radical and the ionic strength thereof, is very high. Moreover, aluminum chloride also exerts its astringent properties over a relatively long period of time. In this connection, aluminum chloride produces a substantially immediate closing of the pores encasing the sweat glands and it serves to maintain them in that condition for a longer period of time than do other aluminum, or for that matter other ferric, salts which also possess astringent properties.

While aluminum chloride has the advantages outlined and, further, does not cause discoloration such as is produced by ferric chloride, it has the very serious drawback or disadvantage, shared also by others of the astringent materials, of being excessively acid in reaction. In order to prevent the hydrolysis of the aluminum chloride to insoluble and inefficient aluminum hydrate, it is necessary to maintain it in an excess acid concentration. This excessive acidity is very objectionable for cosmetic purposes for various reasons. Thus, it causes, in various cases, skin irritations which may and frequently do manifest themselves by a noticeable reddening of the skin. This condition is not infrequently aggravated, causing itching which, in turn, may develop into an eruption of pimples or even infection, particularly under the armpits. Again, the excess acidity of the aluminum chloride preparations brings about a destruction of clothing fabrics, particularly those made of cotton, and, further, discolors, if not actually bleaches, a goodly number of dyed materials. Hence, while aluminum chloride possesses many desirable properties as an astringent material, it also, unfortunately, has certain serious drawbacks which have tended to militate against its use.

I have made the discovery that by the addition of a certain class of chemical compounds, hereinafter set forth in detail, astringent materials and preparations are remarkably improved with respect to overcoming the defects of excessive acidity. While the principle of my invention is applicable to astringent materials generally which possess defects or disadvantages such as those pointed out hereinabove in connection with the use of aluminum chloride, it has particular and unusual applicability to preparations where aluminum chloride is employed as the astringent material.

I have discovered that by adding to an astringent material chemical compounds characterized by the linkage

which chemical compounds have only feebly ionizing properties or a very low factor of ionization, the disadvantages of excessive acidity are eliminated or at least substantially decreased without noticeable or appreciable detraction from the efficiency of the astringent material. Such addition agents should, of course, be compatible with the astringent material when the latter is utilized in liquid or lotion form, in stick form, or in the form of a cream or emulsion, as the case may be. The addition agents may possibly react with the excess hydrochloric acid, in case, for example, aluminum chloride is the astringent material utilized, to form addition compounds. At least, they possess the property of counteracting the effect of the hydrochloric acid or the like which may be liberated by the aluminum chloride or similar astringent material. Whatever the exact mechanism of the reaction may be, I have demonstrated that, in accordance with the teachings of my invention herein, astringent preparations are remarkably improved without deleterious effect on their efficiency.

As I have stated, the addition agents which I employ are characterized by the presence of the nucleus

The compounds which contain this linkage are many and include, for example, the amides such as acetamide, propionamide, butyramide and the homologues including the higher molecular weight amides such as the amides of lauric, myristic, palmitic, oleic and stearic acid.

A sub-class of the compounds having the nucleus set out hereinabove are the urethanes or carbamic acid derivatives which are characterized by the nucleus

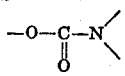

A particularly useful member of this series of compounds is urethane which is the ethyl ester of carbamic acid (ethyl carbamate), namely,

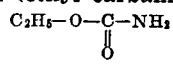

Other compounds having the characteristic urethane linkage are, for example, methyl carbamate, propyl carbamate, butyl carbamate, amyl carbamate and the homologues thereof such as dodecyl carbamate, stearyl carbamate, and the like; phenyl carbamate, benzyl carbamate, etc. In general, the carbamic acid derivatives which may be employed in accordance with this invention fall within the formula

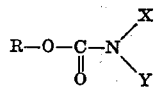

wherein R is an organic radical of aliphatic, cycloaliphatic, araliphatic, or aryl character such as methyl, ethyl, propyl, butyl, cyclohexyl, benzyl, phenyl, and substitution products thereof, and the like; and X and Y represent hydrogen, or organic radicals of aliphatic, cycloaliphatic, araliphatic, hydroaromatic or aryl character such as those, for example, represented by R. The radicals X and Y may be the same, as in the case of urethane wherein each is hydrogen, or they may be different as, for example, in the case of the compounds

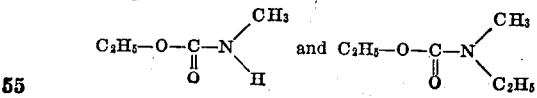

Still another sub-class of compounds encompassed within my invention is the urea derivatives falling within the scope of the general formula

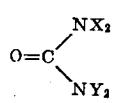

wherein X and Y are hydrogen or organic aliphatic, cycloaliphatic, aromatic, aliphatic-aromatic, hydroaromatic, or heterocyclic radicals such as hydrocarbon radicals including alkyl, cycloalkyl, aryl and aralkyl radicals or derivatives or substitution products thereof such as hydroxy and the like. It will be understood that X and Y may be the same radical or they may be different radicals. The simplest compound in this sub-class is urea, in which case X and Y of the general formula are each hydrogen. Other compounds falling within the scope of the general formula are, for example:

(a) 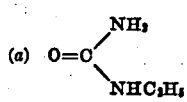

(b) 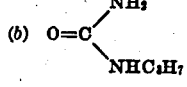

(c) 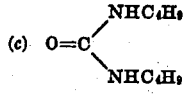

(d) 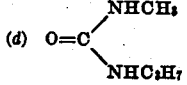

(e) 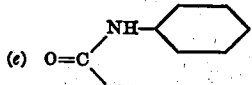

(f) 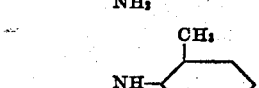

(g) 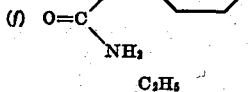

(h) 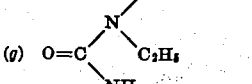

Many of the compounds which I may employ as addition agents may also be represented by the general formula

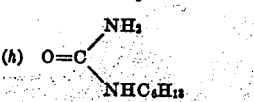

wherein R is represented by alkyl, cycloalkyl, aralkyl, aryl, oxyalkyl, oxycycloalkyl, oxyaralkyl, oxyaryl, or by

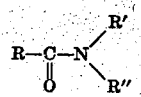

wherein X and Y are hydrogen or have the same significance as pointed out in the previously set forth generic formula for the urethanes, and R' and R'' are hydrogen or other groups similar to those represented by X and Y in the general formula for said urethanes.

Of the numerous compounds disclosed hereinabove, acetamide, urethane, and urea are particularly useful and, of these, urea is outstandingly satisfactory.

In order that those skilled in the art may even more fully understand the manner in which my invention may be practiced, I set out hereinbelow various specific embodiments. It will be understood that these are mentioned only as illustrative and are not to be construed as limitative of my invention in any manner. Thus, for example, the proportions of ingredients may be varied, different combinations of ingredients may be employed, and other changes may be made without departing from the principles of my invention as set out hereinabove and in the appended claims. In the following examples, all parts are by weight:

Example I

| | Parts |
|---|---|
| Aluminum chloride | 20 |
| Urea | 15 |
| Water | 65 |

Example II

| | Parts |
|---|---|
| Aluminum chloride | 15 |
| Acetamide | 20 |
| Water | 65 |

Example III

| | Parts |
|---|---|
| Aluminum chloride | 15 |
| Urethane | 25 |
| Water | 60 |

Example IV

| | Parts |
|---|---|
| Aluminum chloride | 15 |
| Stearic acid | 5 |
| Urea | 10 |
| Water | 55 |
| Acid emulsifying agent * | 15 |

Example V

| | Parts |
|---|---|
| Aluminum chloride | 20 |
| Urea | 15 |
| Spermaceti | 6 |
| Stearic acid | 4 |
| Montan wax | 2 |
| Water | 55 |
| Acid emulsifying agent * | 8 |

Example VI

| | Parts |
|---|---|
| Aluminum chloride | 15 |
| Acetamide | 15 |
| Spermaceti | 10 |
| Water | 50 |
| Acid emulsifying agent * | 10 |

Example VII

| | Parts |
|---|---|
| Aluminum chloride | 15 |
| Urethane | 15 |
| Spermaceti | 5 |
| Stearic acid | 4 |
| Oxystearin | 4 |
| Water | 50 |
| Acid emulsifying agent * | 7 |

*A product known in the trade as "Tegacid," which is apparently a reaction product of monostearin with a phosphoric acid derivative of oleic acid amide of diethyl ethylene diamine.

In case the astringent preparation is made up in the form of a solution, as shown in Examples I, II and III, it is necessary only to mix the astringent material and the addition agent with the water to effect solution of the same.

Where the astringent preparation comprises a cosmetic cream as, for instance, in Example IV, the mode of preparation is preferably as follows: The acid emulsifying agent and the waxy and fatty materials are initially melted together at a temperature of approximately 70 degrees C. and then the urea dissolved in water is added at 70 degrees C. and the mass is stirred to effect emulsification. The emulsion is allowed to cool, while stirring, to 50 degrees C. and the aluminum chloride is then added in dry form and dispersed through the mass by mixing.

The addition agents which I employ herein are preferably water-soluble, particularly in case the astringent preparation comprises an aqueous solution. Where, however, the astringent preparation comprises a cosmetic cream or the like, it is unnecessary that the addition agent be freely water-soluble. In such case, it is effective if dispersible in aqueous media as, for example, in the case of stearamid. I prefer, however, that the addition agents be relatively freely water-soluble. I employ the term "soluble" herein, therefore, to mean both true or molecular solubility as well as dispersibility.

The proportions of the ingredients are subject to relatively wide variation. In general, however, I prefer to employ, based on the weight of the finished astringent preparation, from about 15 to 25% of aluminum chloride or similar astringent material and from about 5 to 15% of urea or similar addition agents, said percentages being by weight. The amount of addition agent should be sufficient to counteract the effect of the excessive acidity due to the astringent material. Those skilled in the art will, in the light of my teachings herein, be able to select proportions of ingredients to suit their particular purposes.

Where I prepare the astringent preparation in emulsion form such as, for example, in the cosmetic creams, I may use any acid emulsifying agent. I have found the acid emulsifying agent employed in Examples IV, V, VI and VII to be particularly suitable for my present purposes and, therefore, prefer to utilize the same. However, as stated, those skilled in the art may select any well known acid emulsifying agents where astringent preparations require the use of emulsifying agents. Among such other acid-emulsifying agents may be, for example, the compounds disclosed in Patent No. 2,089,212.

What I claim as new and desire to protect by Letters Patent of the United States is:

1. A cosmetic astringent preparation including aluminum chloride and acetamide.

2. A cosmetic astringent preparation including aluminum chloride and urethane.

3. A cosmetic astringent preparation including an astringent material and a soluble chemical compound having a nucleus

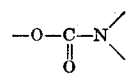

4. A cosmetic astringent preparation including aluminum chloride and a soluble urethane.

5. A cosmetic astringent preparation containing from about 15% to 25% of aluminum chloride and from about 5% to 15% of a soluble urethane, said percentages being by weight of the astringent preparation.

6. A cosmetic astringent preparation including an astringent material in the form of a metal salt which hydrolyzes to produce an acidic material, said preparation containing a proportion of a soluble fatty acid amide, the fatty acid radical of said amide containing at least two carbon atoms.

7. A cosmetic astringent preparation including an astringent material in the form of a salt of aluminum with a strong inorganic acid, said preparation containing a proportion of acetamide.

8. A cosmetic astringent preparation including an astringent material in the form of a metal salt which hydrolyzes to produce an acidic material, said preparation containing a proportion of a soluble ester of carbamic acid.

9. A cosmetic astringent preparation including an astringent material in the form of a salt of aluminum with a strong inorganic acid, said preparation containing a proportion of urethane.

10. A cosmetic astringent preparation including an astringent material, and a soluble chemical compound represented by the formula

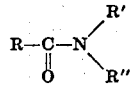

wherein R is selected from the group consisting of alkyl, cycloalkyl, aralkyl, aryl, and the corresponding oxy-radicals, and R' and R'' are selected from the group consisting of hydrogen, alkyl, cycloalkyl, aralkyl and aryl.

11. A cosmetic astringent preparation including an inorganic salt of aluminum as an astringent material, and a soluble chemical compound represented by the formula

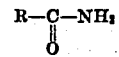

wherein R is oxy-alkyl.

JULES B. MONTENIER.